United States Patent

Kjaer-Pedersen et al.

Patent Number: 6,131,502
Date of Patent: Oct. 17, 2000

[54] CAVITY JACKET FOR PLUNGER PISTON

[75] Inventors: Eric C. Kjaer-Pedersen, Vernon; Kenneth D. Wilson, Lumby, both of Canada

[73] Assignee: Kare Innovation Corporation, Vernon, Canada

[21] Appl. No.: 09/199,787

[22] Filed: Nov. 25, 1998

Related U.S. Application Data

[60] Provisional application No. 60/066,923, Nov. 28, 1997.

[30] Foreign Application Priority Data

Nov. 28, 1997 [CA] Canada ................................. 2238802

[51] Int. Cl.⁷ .............................. E01B 3/00; C03B 11/06
[52] U.S. Cl. ................................ 92/113; 65/159; 65/168; 65/362
[58] Field of Search ............................ 92/51, 113, 114; 91/170.1, 171.1, 169; 65/159, 168, 171, 362

[56] References Cited

U.S. PATENT DOCUMENTS

| | | | |
|---|---|---|---|
| 4,272,273 | 6/1981 | Trahan et al. | 65/167 |
| 5,139,559 | 8/1992 | Kozora | 65/158 |
| 5,334,233 | 8/1994 | Kozora | 65/171 |
| 5,358,543 | 10/1994 | Kozora | 65/319 |

*Primary Examiner*—Edward K. Look
*Assistant Examiner*—Thomas E. Lazo
*Attorney, Agent, or Firm*—Antony C. Edwards

[57] ABSTRACT

A device for inhibiting glass from falling into an annular cavity formed between a plunger piston and an inner piston telescopically journalled within a longitudinal cavity within the plunger piston includes a rigid sleeve mountable to the plunger piston, adjacent walls of the longitudinal cavity, so as to substantially fill the annular cavity. The sleeve is mountable into snug sliding relation with the inner piston.

1 Claim, 6 Drawing Sheets

CAVITY JACKET FOR PLUNGER PISTON

CROSS REFERENCE TO RELATED APPLICATION

This application claims priority from U.S. Provisional Patent Application Ser. No. 60/066,923 filed Nov. 28, 1997 titled Cavity Jacket for Plunger Piston.

FIELD OF THE INVENTION

This invention relates to glass blowing machinery and in particular to an improvement in the plunger piston assembly so as to inhibit glass particles being blown into good ware subsequent to a jam.

BACKGROUND OF THE INVENTION

Presently, in glass blowing machinery employed in the prior art, a gob of molten glass is suspended above a hollow actuable plunger piston. Applicant is aware of plunger pistons manufactured by Maul and by Emhart. The plunger piston is actuated so as to telescope along an inner hollow piston journalled within the longitudinal cavity within the hollow plunger piston. The plunger piston extends telescopically over the inner piston so as to drive a perforated plunger, located at the distal end of the plunger piston, into the gob of molten glass. A stream of air is forced along the longitudinal cavity within the inner piston and the longitudinal cavity within the plunger piston so as to exit the perforations in the plunger.

Occasionally a jam occurs causing glass from the gob of molten glass to fall downwardly through the perforations or holes in the plunger. Some of the glass falling through the perforations or holes in the plunger falls into the longitudinal cavities within the inner piston and plunger piston. This glass is blown out by the air stream and so does not cause a later problem. However, some of the glass falling through the perforations or holes in the plunger fall into the annular cavity formed between the inner piston and the plunger piston within the longitudinal cavity of the plunger piston. This glass, not being in the air stream, is not blown out and so may reside in the annular cavity until after the jam has been cleared and subsequent good ware is being formed. The glass residing in the annular cavity works itself out of the annular cavity, assisted by the subsequent telescoping actuation of the plunger piston relative to the inner piston, and is thus subsequently blown by the air stream into the good ware. This causes particles of glass to become lodged within the good ware, ruining the good ware. Glass residing within the annular cavity may also interfere with the function of the scraper bushing between the plunger piston and the inner piston so as to shorten the life of the scraper bushing.

It is the object of the present invention to provide a device to inhibit glass falling into the annular cavity.

SUMMARY OF THE INVENTION

In summary, the device for inhibiting glass from falling into an annular cavity formed between a plunger piston and an inner piston telescopically journalled within a longitudinal cavity within the plunger piston includes a rigid sleeve mountable to the plunger piston, adjacent walls of the longitudinal cavity, so as to substantially fill the annular cavity. The sleeve is mountable into snug sliding relation with the inner piston.

DETAILED DESCRIPTION OF THE PREFERRED EMBODIMENT

Figure 1:
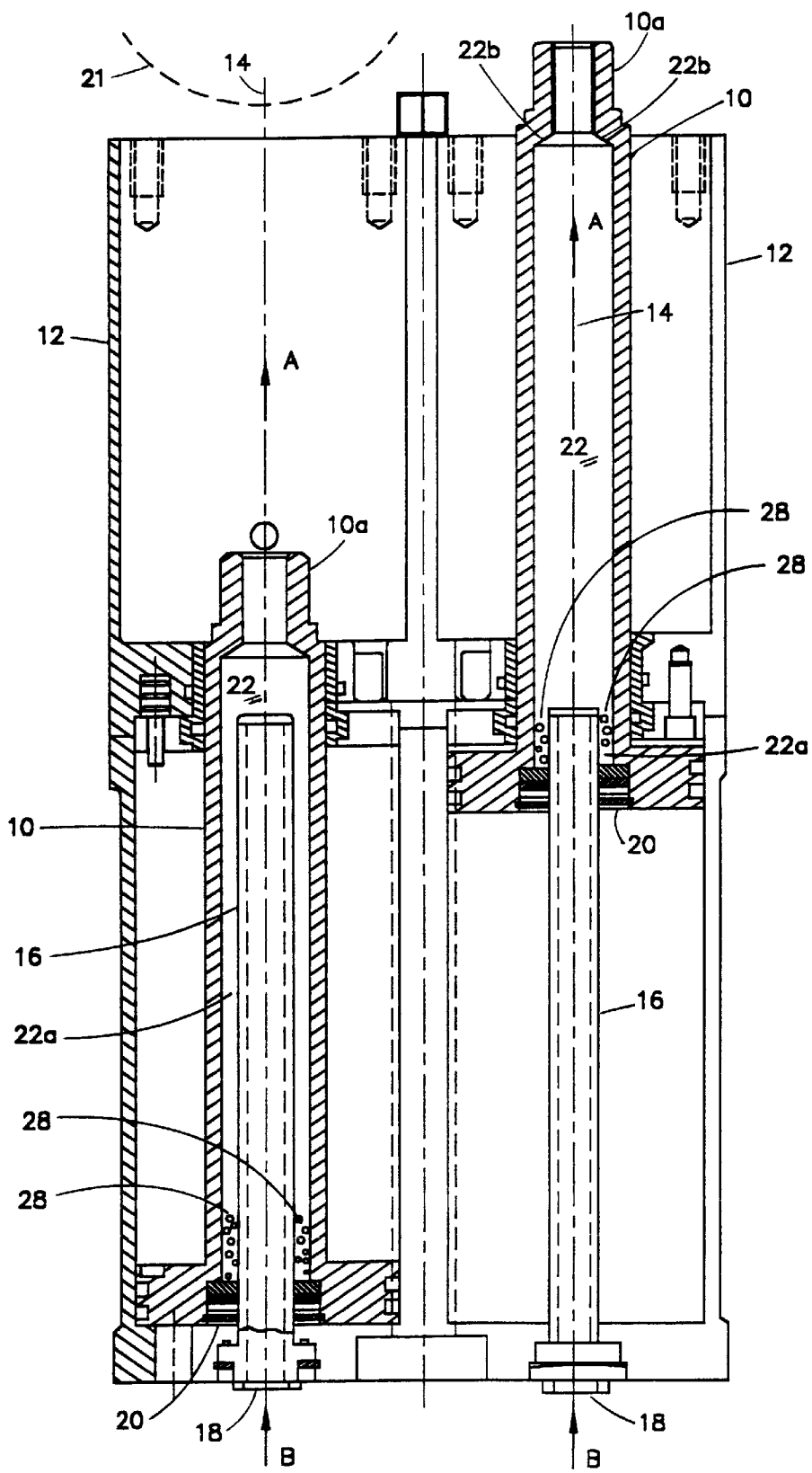
FIG. 1 is, in front elevation cross-sectional view, prior art plunger pistons.

FIG. 1 illustrates a pair of adjacent parallel plunger pistons manufactured by Emhart.

Figure 2:
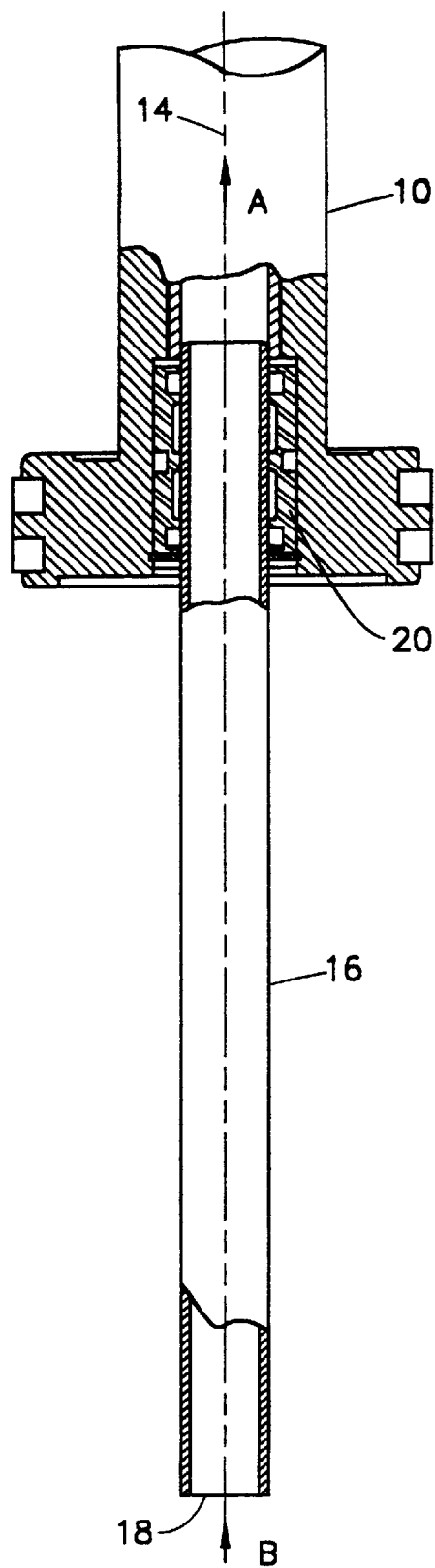
FIG. 2 is, in an enlarged front elevation cross sectional view, a plunger piston in its extended position with the sleeve of the present invention installed.
Figure 2A:
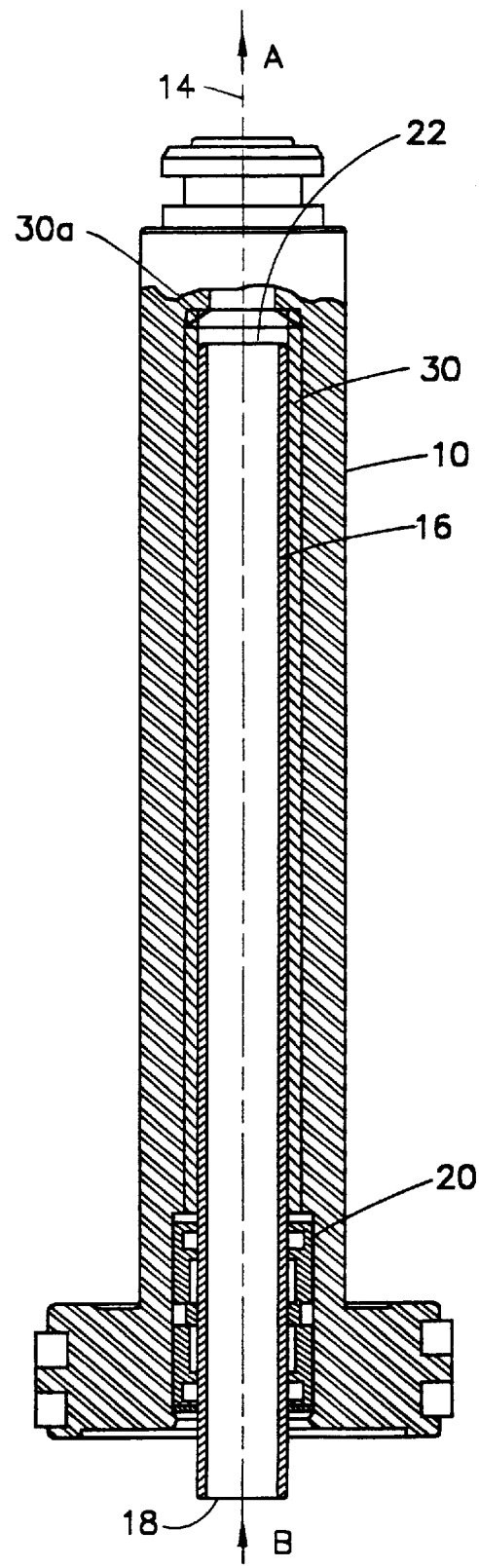
FIG. 2a is the plunger piston of FIG. 2 in its retracted position.

FIGS. 2 and 2a illustrate a plunger piston, as manufactured by Maul, with the sleeve of the present invention installed. The piston is shown in an extended position in FIG. 2, and in a retracted position in FIG. 2a. In FIGS. 1, 2 and 2a, plunger pistons 10 are telescopically actuable within housings 12 in direction A along longitudinal axis 14. Plunger piston 10 telescopes along longitudinal axis 14 relative to fixed inner piston 16. Inner piston 16 is rigidly mounted to housing 12 at air stream inlet 18. Inner piston 16 is slidably journalled within scraper bushing 20 mounted at the base of plunger piston 10.

Figure 3:
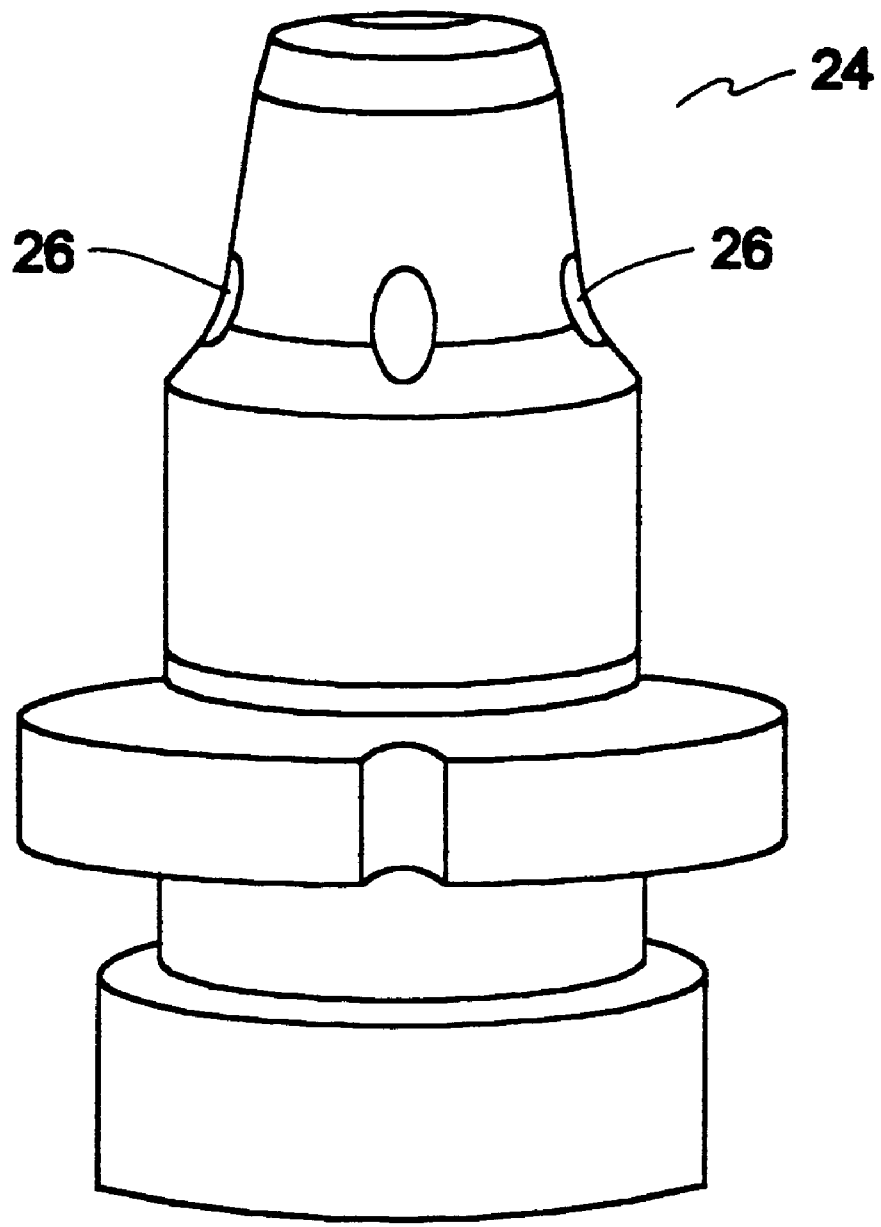
FIG. 3 is, in perspective view, a plunger.

Plunger piston 10 and inner piston 16 are hollow along longitudinal axis 14 so that a pressurized air stream entering air stream inlet 18 in direction B passes through inner piston 16 along its longitudinal cavity and flows into the longitudinal cavity 22 within plunger piston 10. Plunger 24 shown in FIG. 3 is also hollow and mounts onto end 10a of plunger piston 10. The internal cavity and upper apertures or holes 26 in plunger 24 are in air-flow communication with longitudinal cavity 22 so that the pressurized air stream flowing through inner piston 16 and longitudinal cavity 22 in plunger piston 10, also flows through the longitudinal cavity (not shown) of plunger 24 and out through holes 26.

Figure 4:
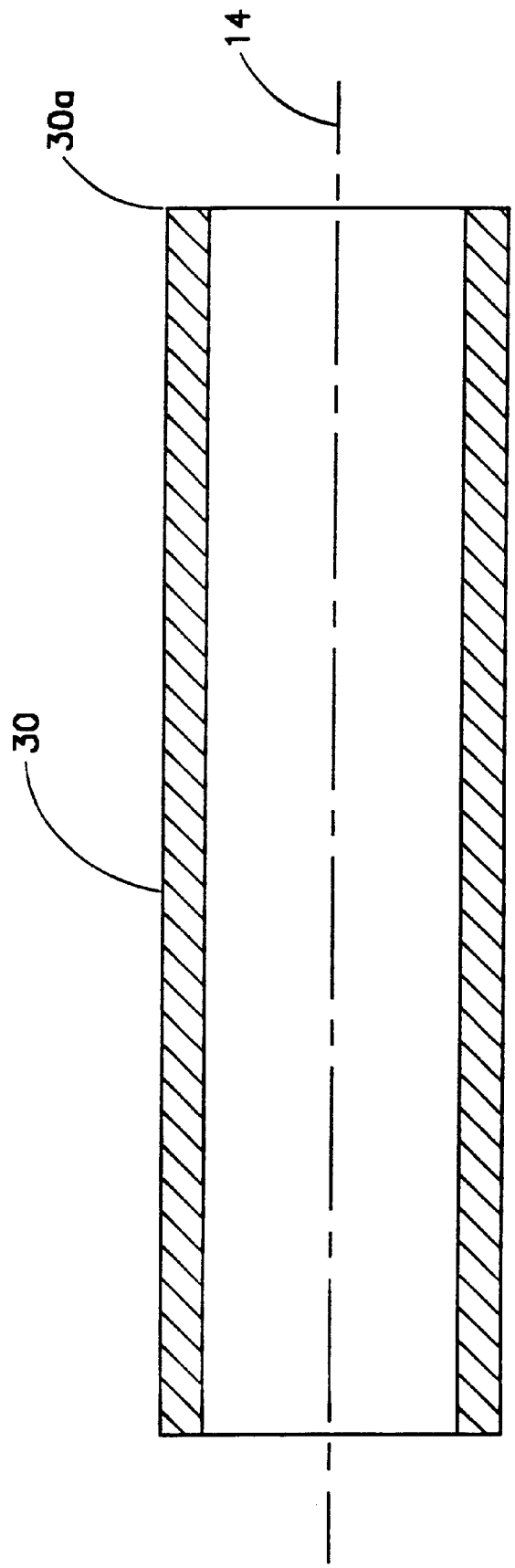
FIG. 4 is, in front elevation cross sectional view, a sleeve of the present invention.
Figure 5:
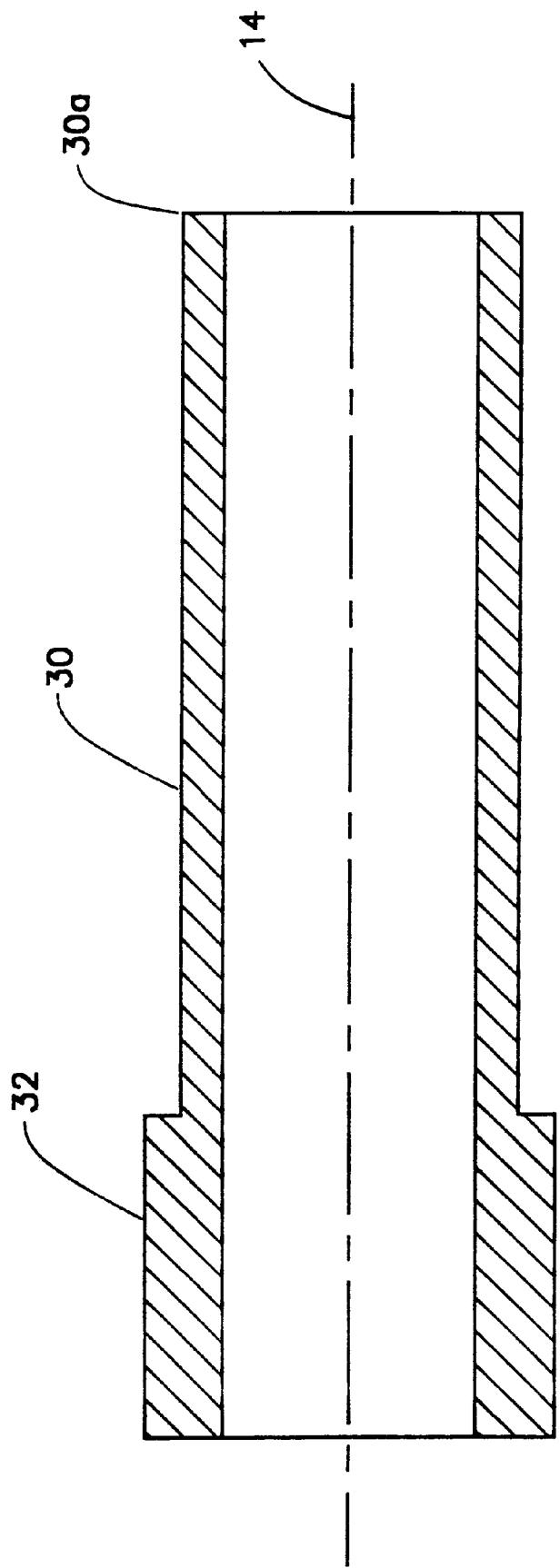
FIG. 5 is, in front elevation cross sectional view, an alternative embodiment of the sleeve of the present invention.
Figure 6:
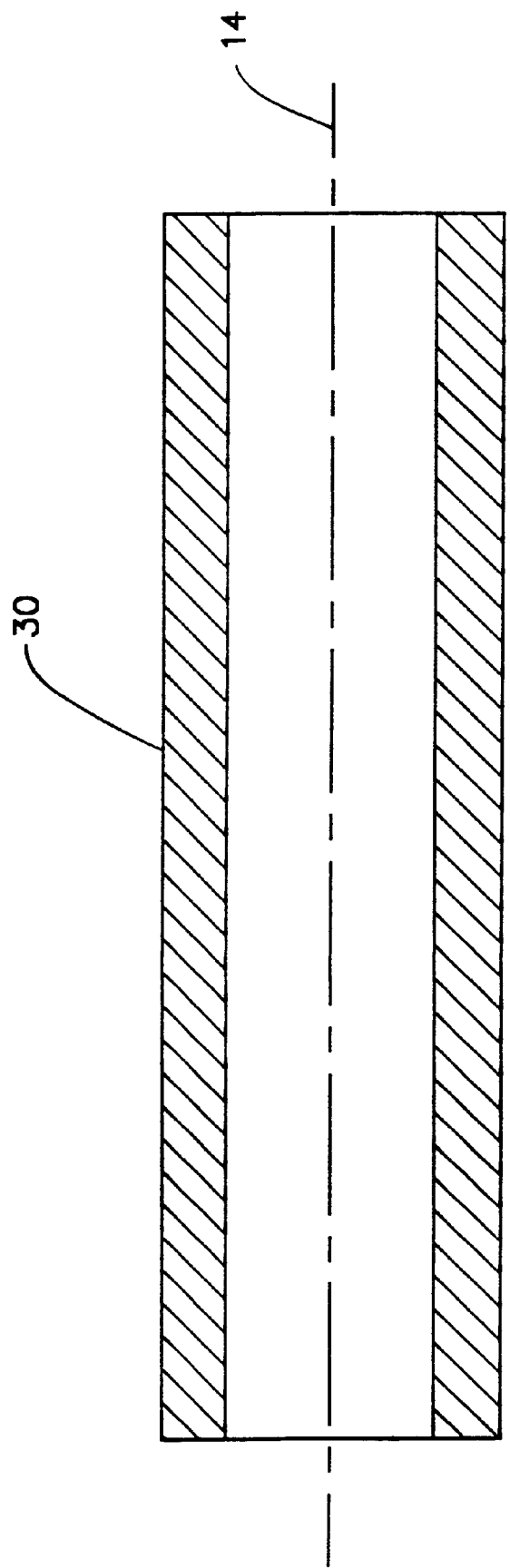
FIG. 6 is, in front elevation cross section view, a further embodiment of the sleeve of the present invention.

In the event of a jam of the glass blowing machinery, glass from the gob of molten glass 21, shown in dotted outline as suspended above the plunger piston 10, falls through holes 26 in plunger 24 and downwardly into longitudinal cavity 22. Some of the glass 28 comes to rest within annular cavity 22a which is formed between the outer surface of inner piston 16 and the inner wall of plunger piston 10 lining cavity 22. As best seen in FIG. 2a the sleeve 30 of the present invention, seen isolated in FIGS. 4–6, are inserted so as to substantially fill annular cavity 22a along its entire length when inner piston 16 is fully journalled within longitudinal cavity 22, that is, when plunger piston 10 is retracted. Sleeve 20 is sized to close tolerances so as to completely as possible fill the void of annular cavity 22a without interfering with the sliding fitment and actuation of plunger piston 10 telescopically sliding relative to inner piston 16.

Sleeve 30 made be of any suitable material such as bronze, bronze 660, brass or steel. As may be seen, sleeve 30 is mounted snugly adjacent so as to line the walls of longitudinal cavity 22. Sleeve 30 thus remains stationary relative to plunger piston 10 as plunger piston 10 telescopes relative to inner piston 16 in direction A along longitudinal axis 14. Due to the squared off upper rim 30a of sleeve 30, bevelled shoulder 22b at the longitudinally distal end of longitudinal cavity 22 has to be machined square, or otherwise, the shape of rim 30a altered for a conformal fit between rim 30a and the longitudinally distal end of longitudinal cavity 22.

In some models of plunger piston 10 the lower most end of longitudinal cavity 22 has an increased axial radius about longitudinal axis 14 relative to the radial dimension of the upper end of the longitudinal cavity. In these incidences, sleeve 30 is advantageously formed as seen for example in FIG. 5 so as to fill the non-uniformly cylindrical longitudinal cavity 22, for example, by means of raised collar 32. In some models of plunger piston 10, cavity 22a is larger than in other models. Consequently, the thickness of the walls of sleeve 30 may be thicker as seen in FIG. 6 (as compared to FIG. 4) to fill the void.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A device for inhibiting glass from falling into an annular cavity formed between a plunger piston and an inner piston telescopically journalled within a longitudinal cavity within said plunger piston comprising:

a rigid sleeve mountable to said plunger piston, adjacent walls of said longitudinal cavity, so as to substantially fill said annular cavity, said sleeve mountable into snug sliding relation with said inner piston.

\* \* \* \* \*